3,269,890
METHOD OF FORMING SIZED PAPER CONTAINING AN EPIHALOHYDRIN PREPOLYMER AND PAPER THEREOF
Van R. Gaertner, Ballwin, Mo., assignor to Monsanto Company, St. Louis, Mo., a corporation of Delaware
No Drawing. Filed Sept. 10, 1962, Ser. No. 222,679
11 Claims. (Cl. 162—164)

This invention relates to compositions useful for sizing and water-proofing polysaccharide materials, to polysaccharide materials treated with said compositions, to methods for preparing said compositions, and methods for treating polysaccharide materials with said compositions. More particularly, this invention is directed to water soluble or dispersible organic nitrogen prepolymer compositions containing hydrophobic groups, to polysaccharide materials, especially, paper, starch, and cellulosic textiles treated with said organic nitrogen prepolymers, to methods of preparing said prepolymers and methods of treating said polysaccharide materials with said prepolymers in an efficient manner. When the prepolymers are applied to paper, starch, and cellulosic polysaccharide substrates they are characterized by imparting to said substrates a substantial amount of permanent sizing and by their resistance to being washed off by water or common organic solvents.

According to one aspect of this invention there is provided a process for preparing prepolymers containing hydrophobic groups involving the reaction of (a) an adduct of an epihalohydrin and an amine having at least one primary amino nitrogen and an average of from 2 to 8 amino hydrogens per amine molecule, and (b) an amine having at least 2 amino hydrogens. For preparing these prepolymers it is essential that the adduct (a) be the reaction product of at least 2 molar proportions of the epihalohydrin reactant per mole of the amine reactant. The adduct (a), however must not be a polymerized material but must be essentially a monomeric material so that when it is reacted with amine (b) a prepolymer reaction product is formed. This result may be accomplished at atmospheric pressure by reacting the epihalohydrin and amine used to form the adduct at a temperature not above 50° C., preferably at 10° to 35° C., although temperatures as low as 0° C. or lower can be used. When the epihalohydrin reacts with the amine reactant, the added epihalohydrin becomes a haloalkanol group of the adduct. The adduct reactant (a) must have at least 2 haloalkanol groups per molecule of amine to which the epihalohydrin was added. At least one of said adduct (a) and amine (b) reactants contains a hydrophobic group. This hydrophobic group is preferably an alkyl or alkenyl radical having at least 10 carbon atoms. Such hydrophobic groups can contain any number of carbon atoms greater than 10 but a number up to about 24 is suitable and practical in such reactants. At least one of said reactants (a) and (b) is at least trifunctional, i.e., either or both of the two reactants (a) and (b) has at least 3 reactive groups. For example, when the adduct (a) is trifunctional, it contains at least 3 haloalkanol groups per molecule of adduct. When the amine (b) is trifunctional such amine has at least 3 reactive amino hydrogens per molecule of amine. For preparing the prepolymers used in this invention, the molar equivalent ratio, i.e., the molar proportions of said adduct (a) to said amine (b) must be such that the adduct reactant (a) provides at least 3 haloalkanol equivalents, and the adduct reactant (a) and the amine reactant (b) provide at least 3 amino hydrogen equivalents for a combined total of from 6 to 14 haloalkanol and amino hydrogen equivalents.

Another aspect of this invention is to provide water-soluble and water dispersible organic nitrogen prepolymer compositions and mineral acid salts of said prepolymers by reacting an adduct (a) with an amine (b), as described above, said prepolymers being additionally characterized by the fact that when they are contacted with an aqueous medium having a pH of about 5 or higher they convert or polymerize to an insoluble cross-linked polymer, i.e., the prepolymer polymerizes to a polymer which is not soluble in water, alcohol, oil, or common solvents.

Another aspect of this invention provides polysaccharide materials treated with a minor proportion of the organic nitrogen prepolymer compositions, described above, as new compositions of matter.

Another aspect of this invention provides methods for sizing, water-proofing, and rendering polysaccharide substrates resistant to water and ink penetration by treating said polysaccharide material by impregnation, mixing, spraying, coating, or by other conventional methods with the organic nitrogen prepolymer compositions of this invention.

Another aspect of this invention provides a process for conveniently and efficiently sizing paper products by incorporating into the aqueous pulp which is to be used to make said paper a minor amount of the ingredients of the prepolymer compositions of this invention, and then forming the resulting treated pulp into paper according to conventional techniques.

The composition which is termed a "prepolymer" is a lower polymeric material which is a polymer precurser, or intermediate, still having a total average of at least three functional units per molecule of prepolymer, i.e. the average total of amino hydrogens and haloalkanol/ epoxyalkyl units is at least three. The functional "haloalkanol" group is derived from the epihalohydrin added to the amine in forming adduct (a) and is the adduct form of such epihalohydrin. Thus, when epichlorohydrin is used the resulting haloalkanol group is

The prepolymer contains halogen as an essential moiety thereof, and such halogen is present in the prepolymer product both as part of a haloalkanol group and as hydrohalide salts of the amine nitrogens. When the salt group is derived from the haloalkanol group there remains in place of the haloalkanol group an epoxyalkyl group, but, in such event, the prepolymer still contains the original halogen as "haloalkanol" equivalent. In the embodiments contemplated by me it is desired to keep the prepolymer in such state until it is applied to a polysaccharide substrate in minor amounts, where the prepolymer sets up or polymerizes to an insoluble polymeric material in the medium of the substrate, e.g., in cellulose fibers, of pulp used in making paper. The prepolymer product is preferably maintained in solution or suspension in the solvent or diluent used in its preparation, such as in a lower alkanol, preferably methanol or isopropanol.

The adduct starting material (a), which is used in preparing the products of this invention, has at least 2 molar equivalents of haloalkanol per mole of amine used in preparing the adduct. When the amine used in preparing the adduct is a diamine, triamine, or other polyamine the adduct preferably contains more than 2 haloalkanol equivalents, and may contain up to, say, 7 haloalkanol molar equivalents per mole of adduct. I have prepared such aducts by condensing an excess molar amount of an epihalohydrin with the amine used, said molar amount of epihalohydrin being determined by the number of amino hydrogens in the amine, i.e., the number of hydrogen atoms bonded to amino nitrogen, and then using a molar excess amount, say, from 2% to 50%, preferably about 10%-30% excess epihalohydrin based on that number of amino hydrogens. The adduct is prepared by combining the epihalohydrin and amine in the presence of an inert, non-reactive solvent or diluent, such as the liquid alkane hydrocarbons such as hexane, heptane or, as is preferred in a lower alkanol such as methanol, ethanol, isopropanol, etc. with methanol being especially preferred, at low or ordinary room temperatures at atmospheric pressure.

The epihalohydrin used in preparing the adduct starting material is preferably epichlorohydrin but may be epibromohydrin, epiiodohydrin or one of the higher molecular weight vicinal halohydrins such as 3-chloro-1,2-epoxybutane, 3-chloro-1,2-epoxypentane, etc.

Any amine having the above described characteristics may be used in the process of this invention. Useful amines include monoamines, diamines, and polyamines having at least two primary amino hydrogens. The preferred amines for use in preparing the adduct ($a$) and the amine ($b$) each have a formula selected from the group consisting of (I)

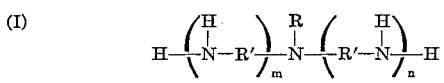

and (II)

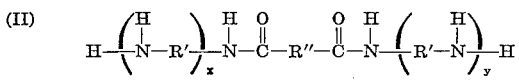

wherein R is alkyl, alkenyl or acyl radicals such as R'''—C(O)— wherein R''' is a long chain alkyl or alkenyl radical having at least 10 carbon atoms, preferably from 18 to 24 carbon atoms, each R' is a bivalent alkylene radical having from 2 to 6 carbon atoms, each of $m$ and $n$ is an integer of from 0 to 6, $m$ plus $n$ equals 0 to 6, each of $x$ and $y$ are integers of at least 1, $x$ plus $y$ equals 2 to 6, and R'' denotes a bivalent hydrocarbon radical which can be a straight alkylene or alkylene having from 2 to 20 carbon atoms, or a branched or carbocyclic alkylene or alkenylene radical having from, say 3 to 40 carbon atoms.

For paper-sizing applications it is necessary that either the amine used in preparing the adduct ($a$) or the amine ($b$), preferably both, have a hydrophobic group bonded to a nitrogen atom of the amine. Such groups are preferably alkyl or alkenyl radicals having at least ten carbon atoms, or acyl radicals of the formula R'''C(O)— having at least 10 carbon atoms in said R''' group such as those from oleic acid, palmitic acid, etc. Other hydrophobic group containing amines which may be used are those obtained by condensing fatty acids, or dimer and trimer unsaturated aliphatic acids such as sebacic acid, dodecanedioic acid, octadecanedioic, docosanedioic acids, etc. with amines to obtain amido-amines having carbon chain branches of at least 10 carbon atoms.

The amine used in preparing the adduct has at least two primary amino hydrogen bonds and may contain 1 or more secondary amino hydrogen bonds, and even some tertiary nitrogen linkages. The epihalohydrin generally adds preferably at the primary nitrogen, and then at the secondary nitrogen, forming the haloalkanol group in each position to which it adds. It is preferred that all, or nearly all of the primary amino hydrogens in the adduct amine ($a$) be replaced with haloalkanol groups by use of the epihalohydrin, and that a substantial number of any secondary amino hydrogens in the adduct amine be so replaced.

Amine compounds that may be used in the process of this invention are those having at least 2 and up to about 8 amino hydrogens per molecule and include ammonia, lower alkyl and lower alkenyl primary monoamines such as methylamine, ethylamine, isopropylamine, tert-butylamine, mixed amylamines, n-octylamine, branched chain nonylamine, as well as the alkylenediamines, triamines, and polyamines, with or without an alkenyl or alkyl substituent bonded to nitrogen such as ethylenediamine,
propylenediamine,
butylenediamine,
hexylenediamine,
diethylenetriamine,
dipropylenetriamine,
dipentylenetriamine,
triethylenetetramine,
tributylenetetramine,
trihexylenetetramine,
tetraethylenepentamine,
tetrapropylenepentamine,
pentaethylenehexamine,
pentapropylenehexamine,
N-ethyl-1,2-ethylenediamine,
N-(2-propenyl)-1,3-propanediamine,
N-hexyl-1,4-butanediamine,
N-2-ethylhexyl-1,3-propanediamine,
N-(5-octenyl)-1,6-hexanediamine,
N-butyltriethylenetetramine,
N-hexyltripropylenetetramine and
N-nonyltetrabutylenepentamine,
N-(oleyl)-hexaethyleneheptamine.

When alkenylamines are used the double bond of the alkenyl radical is not attached to the carbon atom bonded to the amino nitrogen atom, but is at least one carbon atom removed from the nitrogen, the double bond is no closer than between the beta and gamma carbon atoms relative to the nitrogen atom.

For polysaccharide sizing applications the amine used in preparing the adduct starting material ($a$) ) or the amine reactant ($b$), and preferably both ($a$) and ($b$), contains an hydrophobic alkyl or alkenyl radical bonded to nitrogen. Such hydrophobic groups are those having at least 10 carbon atoms. The upper limit of carbon atoms in such radicals is not critical, but generally such radicals having up to about 24 carbon atoms are perferred. Examples of such useful amines are:

decylamine,
dodecylamine,
tridecylamine,
tetradecylamine,
hexadecylamine,
octadecylamine,
eicosylamine,
tetracosylamine,
6-tetradecenylamine N-n-octadecenyl-1,3-propanediamine,
N-docosyltriethylenetetramine,
N-tetracosenylpentapropylenehexamine, etc. For ecomonic reasons commercial mixtures of amines having mixed higher alkyl- or alkenylamines, or mixtures of alkyl and alkenylamines are used. Examples of such commercial mixtures are those wherein the alkyl or alkenyl moiety is obtained from natural oil products such as coconut, soybean, tallow, fish oils, and other animal and vegetable oils, which when converted to the amines have as the alkyl moiety a mixture of $C_{10}$ to $C_{22}$ alkylamines. Examples of such commercial mixtures are Armour and Co.'s "Duomeen C," "Duomeen T," "Duomeen O" and other comparable products. These and other synthetic mixtures of di-, tri-, and higher polyamines, up to about heptamines may be obtained by cyanoalkylating a long chain alkyl or alkenylamine e.g., n-octadecylamine, and reducing the product so obtained, by reductively aminating a lower copolymer of ethylene and carbon monoxide, and by reducing a lower molecular weight polyacrylonitrile. Such products are often not completely hydrogenated, but products still containing alkenyl groups therein may be used.

Amine compounds having amido groups therein may also be used in the process of this invention. Such amidoamines are those most commonly obtained by condensing alkanoic, alkenoic, and alkadienoic acids with amines and polyamines. The amido nitrogen atoms and the hydrogens bonded thereto are not counted in determining the maximum extent of reaction with an epihalohydrin, since no epihalohydrin will add to such amido nitrogen atoms under my conditions. Useful amidoamines are obtained, for example, by condensing linoleic and dilinoleic acids with alkylene di- and polyamines. For example, by condensing linoleic acid with polyalkylene-polyamines, there is obtained, an amidoamine of the formula

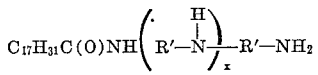

wherein $x$ is a whole number of from 1 to 4, and $R'$ denotes a lower bivalent alkylene radical such as ethylene, propylene, butylene, amylene, or hexylene. Similarly, amido amines obtained from dimer acid compositions may also be used. Examples of such compounds are those obtained by condensing dimers of, say, sorbic acid, geranic acid ($C_{10}H_{16}O_2$) palmitolic, linoleic acid, stearolic acid, humoceric acid ($C_{19}H_{34}O_2$), eicosinic acid, etc., with an alkylenediamine or polyalkylene-polyamine. Such diamido amine compounds may be described as having the general formula

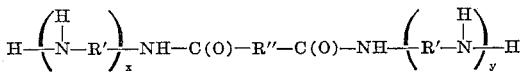

wherein $R'$, $x$ and $y$ are as defined above and $R''$ denotes a bivalent straight branched or carbocyclic alkylene or alkenylene radical derived from the dimer acid composition that was used, and preferably containing from 16 to 40 carbon atoms.

The process of the present invention is conducted by condensing an adduct of an amine and an epihalohydrin with an amine. When diamines and higher polyamines are reacted with an epihalohydrin, the resulting adduct preferably has at least some of the secondary amino hydrogens replaced by haloalkanol groups derived from the added epihalohydrin. For example, the adduct prepared by reacting epichlorohydrin with triethylenetetramine having an average of over 5 added chloropropanol groups per molecule of triethylenetetramine can be used as a starting material in this invention. In preparing the adduct reactant (a), sufficient epihalohydrin, generally an excess, is used to form as completely as possible an adduct wherein all the amino hydrogens are replaced with haloalkanol groups. However, as a practical matter it is generally quite difficult to obtain complete replacement of all such secondary amino hydrogen atoms with haloalkanol groups. For polysaccharide treatment purposes it is desirable to have about 50% or more of the available secondary amino hydrogens replaced with haloalkanol groups.

The reaction between the amine and the epihalohydrin to prepare the adduct (a) is conducted in the presence of at least a trace amount of an hydroxy-containing material, preferably a low molecular weight, volatile alkanol, such as methanol, ethanol or propanol, most preferably methanol, which can be used as solvent or diluent for the reaction mixture as well as the catalyst. The hydroxyl-containing material needed to start the reaction can be supplied in a variety of ways. For example, the small amount of water normally present in some commercially available solvents, such as hexane, heptane, etc., is sufficient to initiate the reaction. However, water is not generally desired as the solvent for this reaction. The hydroxyl-containing material can also be supplied by some of the reaction product, that is, the adduct itself, since such adduct contains hydroxyl groups. The hydroxyl-containing material can also be any other hydroxyl compound, a few examples of which are phenol, alkylene glycols such as ethylene glycol, propylene glycol, etc. The provision of the hydroxyl-containing material to initiate the reaction is critical in the sense that in its absence the reaction between the epihalohydrin and the amine does not take place. For example, attempts to conduct the reaction using dry hexane as solvent resulted in no adduct being formed. However, for most purposes the small amount of hydroxyl-containing material needed to initiate the reaction can be supplied by any source such as are indicated above with no other requirements as to type, amount, etc. being critical. The reaction is conducted at low temperatures, generally, on the order of 0° C. to 50° C. at atmospheric pressure, with temperatures of from 10°–35° C. being preferred. Time periods ranging from 1 to 100 hours are generally sufficient to afford time for a complete as possible addition of haloalkanol groups to the amino nitrogen atoms. Specific time periods within this range can be optimized by those skilled in the art and will vary depending upon the reactants choosen, the solvent, the molar proportions, the temperature used, etc. When the reaction is completed any excess epihalohydrin together with most of the diluent or solvent is removed at low temperatures, not above 50° C., from the adduct obtained, preferably by distilling or flashing off of said materials under reduced pressure. It is not essential to remove all of any diluent or solvent but is preferred to remove substantially all of the excess epihalohydrin. Some additional aspects of preparing said adducts are disclosed in applicant's co-pending application, Ser. No. 212,438, filed July 25, 1962, which is incorporated herein by reference.

The adduct freshly prepared as described may be reacted immediately with an amine in preparing the prepolymer compositions of this invention. Alternatively, the adduct (a) and amine (b) reactants may be separately added as co-monomers to the polysaccharide substrate where at a pH of 5–13 the adduct and amine will react to form the insoluble, cross-linked high polymer.

Another embodiment of this invention which is especially useful for enhancing the rapid development and permanancy of sizing characteristics of the prepolymer compositions on cellulosic paper products is the use of an "aged" adduct, that is, an adduct which has been allowed to stand for some time or which has been heated for a short time before it is reacted with amine reactant (b) in preparing said prepolymer composition. The freshly prepared adduct generally has a neutralization equivalent of from about 150–400, as determined using the Durbetaki reagent (Durbetaki, A. J., Anal. Chem., 28, 2000, (1956)). I have found that when the adduct has been allowed to stand or is gently heated for a time sufficient to raise the neutralization equivalent to, say 200–700, and then reacted with amine in the proportions indicated, the prepolymers so obtained, when applied to paper, in general give improved "off machine" sizing characteristics over similar prepolymer compositions prepared from "freshly prepared" adduct (a) and amine (b) under otherwise identical conditions, using standard paper test methods. However, prepolymer compositions prepared from "fresh" adduct (a) and amine (b) are included in this invention and exhibit substantial permanent sizing of cellulosic paper products.

The reaction product of the adduct (a) and the amine (b) is a prepolymer, i.e., it is a low polymeric functional material still containing reactive haloalkanol groups, glycidyl groups, amino hydrogen atoms, and amine hydrohalide salt groups. The amine hydrohalide salt groups are not removed from the prepolymer until further polymerization is desired, e.g., in the cellulosic matrix of paper products. The retained hydrohalide salt groups serve to limit the extent of reaction in the prepolymer and to make said prepolymer water soluble or at least water dispersible. When said prepolymer product is contacted with an aqueous medium, say, at pH 5 up to pH 13, preferably at pH 6 to 11, the hydrohalide salt groups are removed or hydrolyzed and polymerization proceeds to form an insoluble crosslinked polymer. This invention thus provides products with an inherently limited and stabilized degree of polymerization. To form said prepolymer it is essential that an adduct of an epihalohydrin and an amine be used. The amine used must contain at least one primary amino nitrogen, i.e., an amino nitrogen having two hydrogens bonded thereto. Said amine may contain one or more secondary and/or tertiary nitrogen atoms. Simple secondary amines, i.e., those having only one hydrogen bonded to a nitrogen atom may not be used, since with such amines no prepolymer is formed. The adduct must contain at least 2 haloalkanol groups per molecule of amine used, i.e., a mole of amine used to prepare said adduct, reacts with and takes up at least 2 moles of the epihalohydrin used. In preparing said adduct, which is essential to prepolymer formation, the temperature of the reaction mixture of amine and epihalohydrin is kept low, below 50° C., and preferably at about 10°–35° C. to promote adduct formation, and to minimize any competing deleterious reactions which occur when higher temperatures are used. For example, at higher temperatures greater amounts of disproportionation reactions occur causing formation of by-products, such as dichlorohydrin (1,3-dichloro-2-propanol) when epichlorohydrin is used, and complex mixtures of partially and completely polymerized materials.

The adduct used for reaction with the amine (b) to prepare the prepolymer product may be "fresh" adduct or "aged" adduct. The "fresh" adduct is one which contains very nearly the theoretical number of haloalkanol groups. As a practical matter, however, the adduct contains basic nitrogen and active haloalkanol groups, and the basic nitrogen tends to abstract hydrogen halide from said haloalkanol groups, resulting in the formation of glycidyl groups from the remaining haloalkanol group and hydrohalide salts of the basic nitrogen. An "aged" adduct is one with a measurable amount of its amino nitrogens neutralized with the hydrohalide groups derived from the haloalkanol groups and a portion of the resulting glycidyl groups condensed with amino nitrogens present in the adduct.

The "neutralization equivalent" (N.E.) used in this work is a measure of the hydrogen halide transfer plus the degree of dimerization or polymerization of the adduct and is expressed by the following equation:

$$N.E. = \frac{mg. \text{ of sample}}{me. \text{ of acid required for neutralization}}$$

The number of milliequivalents (me.) is obtained by multiplying the volume by the normality of the standard reagent required for neutralization to the crystal violet end-point. When a sample of adduct is titrated with standard hydrogen bromide in glacial acetic acid reagent the total me. of reagent used measures the basic nitrogens not neutralized by hydrogen halide in the sample plus the me. of oxirane oxygens in the sample. Therefore, a "fresh" sample in which little hydrogen halide transfer has taken place would have a "neutralization equivalent" close to theory (lower N.E.) and would require more me. of standard reagent. An adduct which has "aged" somewhat by hydrogen halide transfer and condensation would require fewer milliequivalents of standard reagent and, therefore, have a higher neutralization equivalent. For example, a "fresh" adduct such as N-n-octadecyl-N',N' - bis(3 - chloro - 2 - hydroxypropyl)-1,3-propanediamine would have a neutralization equivalent nearly equal to the molecular weight divided by the number of amine nitrogens, i.e., $$\frac{510}{2} = 255$$

An "aged" adduct of the same material wherein one chloropropanol group had given up one hydrogen halide to neutralize basic nitrogen, forming a glycidyl group which dimerizes with another similar molecule, would have a neutralization equivalent of $$\left(\frac{1020}{3}\right) = 340$$

The titer of the prepolymer product is a measure of the amount of basic nitrogen which has been neutralized by transferred hydrohalide groups followed by addition of amino groups to the resulting glycidyl groups over and above the changes which occurred during aging of the adduct. It is expressed in terms of number of me. per g. of prepolymer. For example, a prepolymer which is said to have 90% of its original titer is one in which 10% of the basic nitrogens in the prepolymer are neutralized by transferred hydrohalide groups. Similarly a prepolymer having 79% of its original titer is one in which 21% of the basic nitrogen therein has been so neutralized. This titer measurement is also an indication of the degree of dimerization and polymerization which has occurred between the adduct and the added amine since the glycidyl groups generated by hydrogen halide transfer react with the added amine. Since the Durbetaki method measures both basic nitrogen and glycidyl groups, the change in titer ultimately measures the extent of condensation.

In preparing the prepolymers of this invention it is essential that at least one of the adduct (a) or amine (b) be at least trifunctional i.e., it must have 3 reactive sites or groups therein. When the adduct (a) is trifunctional it has therein 3 haloalkanol groups bonded to nitrogen, or at least 2 such haloalkanol groups and 1 active amino hydrogen. When the amine (b) is trifunctional it has at least 3 amino hydrogens per molecule, and these are preferably primary amine hydrogens. This requirement is essential to the preparation of a cross-linked insoluble high polymer when it is desired to allow final polymerization to take place. The adduct (a) and amine (b) are combined in proportions such that the adduct reactant (a) furnishes or provides a minimum total of at least 3 haloalkanol equivalents and the adduct and the amine reactant (b) together provide a minimum total of at least 3 amino hydrogen equivalents, and the sum total of haloalkanol and amino hydrogen equivalents in the two reactants (a) and (b) is at least 6. For most purposes it is preferred that the sum total of haloalkanol and amino hydrogen equivalents in the two reactants be from 6 to 14. For example, when the adduct (a) used is N,N-bis (3-chloro-2-hydroxypropyl)-n-octadecylamine, prepared by adding 2 moles of epichlorohydrin to 1 mole of n-octadecylamine, and the added amine (b) is N-n-octadecyl-1,3-propylenediamine, there is used at least enough of the adduct to provide a minimum ratio of 3 chloropropanol groups for the 3 amino hydrogens in the amine reactant (b). The adduct (a) and amine reactant (b) mixture can be chosen so that the haloalkanol group equivalent in the adduct molecules averages over 3, say 3.1, 4.4, etc. Similarly, the amino hydrogen content for any given reaction mixture can vary over 3. The numbers of haloalkanol groups and amino hydrogens signify chemical equivalents of the functional groups and not molar proportions of reactants. In excess of the given minima of haloalkanol and amino hydrogen equivalents, the relative proportions of the two reactants can vary extensively. For example, an adduct mixture containing 3.8 haloalkanol groups can be admixed with sufficient amount of an amine mixture to give the resulting mixture an amino hydrogen equivalence of, say 5.8.

The above requirements follow from a consideration of the theory of gelation or crosslinking of polymers described by Carothers (H. Mark and G. S. Whitby, editors, "Collected Papers of W. H. Carothers on High Polymeric Substances," Interscience Publishers, Inc., New York, 1940). The critical degree of reaction (Pc) for gelation is related according to Carothers to the average functionality ($f$) by the equation:

$$Pc = \frac{2}{f}$$

The average functionality is defined as the total equivalents of reaction sites divided by the total number of moles of both monomers used. Thus, if two moles of a tri-functional monomer and three moles of a complementary or co-reacting bi-functional monomer are taken, the average functionality is:

$$f = \frac{2 \times 3 + 3 \times 2}{2+3} = \frac{6+6}{5} = \frac{12}{5} = 2.4$$

Then the degree of reaction to obtain gelation is $$Pc = \frac{2}{2.4} = .83$$

That is, 83% reaction is predicted to produce an insoluble cross-linked polymer. Furthermore, cross-linking of complementary monomers occurs only if at least one of the complementary monomers has more than two reactive sites, according to Carothers. If the reaction is highly efficient, the functionality may consist of equal proportions of the two complementary reaction sites. If a monomer may undergo side reactions, i.e., reactions which do not contribute to polymerization, e.g., cyclization intramolecularly, proportionately more of such a monomer must be utilized.

The above amine-halohydrin adducts are relatively inefficent and depending on the adduct and on the added amine and their reactivity, the efficiency may vary from about 50% to about 90%; thus up to 100% functional excess of adduct is required to react completely with the added amine. Complete reaction is nearly impossible to achieve because once gelation begins, the reactive sites are not completely mobile and may not approach complementary sites.

An advantage of the prepolymers of this invention is that they are soluble or dispersible in aqueous systems and are therefore easily applied to paper products. However, sufficient functionality must be provided to produce gelation or insoluble polymer formation under the relatively mild curing conditions available to the papermaker, while maintaining a soluble low molecular weight form until use. In general, the minimum degree of reaction for gelation, the critical value $Pc$, will be in the range 40–80%. Since one monomer must be at least trifunctional and the other at least difunctional and equal equivalents of the two are involved in the reaction the minimum functionality is $$f = \frac{3 \times 1 + 2 \times 1.5}{1 + 1.5} = \frac{3+3}{2.5} = \frac{6}{2.5} = 2.4$$

then $$Pc = \frac{2}{2.4} = .83$$

or 83%, the maximum practically useful degree of reaction.

Since efficiency of the adducts is rarely above 80%, in practice the value of $f$ must be increased to $$f = \frac{2.4}{.8} = 3.0$$

then $$Pc = \frac{2}{3.0} = .66 \text{ or } 66\%$$

In other words in this case the product will not gel or insolubilize until 66% reaction is attained, at least.

The use of haloalkanolamines provides a self-limiting prepolymer synthesis within the ranges required. That is, the haloalkanols do not themselves co-polymerize with the added amines under the conditions employed. Nor do amine hydrohalides react readily with glycidyl groups. However, glycidyl groups readily condense with primary and secondary amines. Thus as hydrogen halide transfers to basic nitrogen, glycidyl groups are generated and condense with free primary and secondary amino groups. However, the process is self-limiting in that, as it proceeds, fewer basic nitrogens and also fewer unchanged haloalkanolamine groups remain. Also some dissociation of the amine hydrohalides occurs, establishing an "equilibrium" point beyond which the polymerization does not proceed under a given set of conditions. As long as this degree of reaction is less than the critical degree, $Pc$, as calculated by the method outlined above, gelation will not occur and the product is a stable prepolymer which may be prepared and stored dissolved or dispersed in water or other solvents such as alcohols.

It is clear that the transferred hydrogen halide is the critical component in preventing premature gelation. It is only necessary to neutralize or hydrolyze the hydrohalide salts in order to allow the reaction to proceed to and beyond the critical degree and give an insoluble cross-linked or gelled polymer if the functionality has been chosen as outlined above.

Conversely if higher functionalities ($f$) are employed it may be necessary to add hydrogen halide or other acids such as sulfuric, phosphoric, and nitric acids, to the adduct in order to control the reaction, that is, to prevent gelation, by further limiting the degree of reaction. For instance, an average functionality of 5 leads to $$Pc = \frac{2}{5} = .4$$

or only 40% reaction.

An example is the formation of a prepolymer from the adduct of N-(n-octadecyl)tripropylenetetramine with 5 epichlorohydrin and monostearoyltetraethylenepentamine. Both adduct and added amine are effectively pentafunctional or the average functionality, $f$, is also 5.

$$f = \frac{5+5}{1+1} = \frac{10}{2} = 5; \quad Pc = \frac{2}{5} = .4$$

In such cases gelation almost invariably occurs unless an acid is added before pre-curing; that is, 1–3 equivalents of concentrated hydrochloric acid added to the adduct solution, followed by the amine in a 1:1 molar ratio and pre-curing 2 hours at 60–70°, will not result in gelation, but a dispersible prepolymer will be obtained. In general it may be necessary to neutralize up to 40% of the basic nitrogens to prevent premature gelation.

In preparing the prepolymer compositions of this invention the adduct ($a$) either freshly prepared or aged as described above, is combined with the amine reactant ($b$), preferably in the presence of a solvent such as hexane, heptane, ethanol, and isopropanol, but preferably methanol, which dissolves both the adduct and the added amine. The reactants ($a$) and ($b$) can be admixed in a variety of ways. The adduct may be added to the amine, either directly or in solution; it is preferred, however, to add the amine, directly or in solution to a solution of the adduct.

When the adduct ($a$) and amine reactant ($b$) are admixed, the resulting mixture can be allowed to stand, but is preferably stirred, at 0° C.–80° C. for from 0.5 to 100 hours, the specific temperature and time being dependent upon the reactants chosen and the necessity of preventing any substantial amount of gelation of the resulting prepolymer product.

The prepolymer product thus obtained does not have to be separated from the solvent used for its preparation. However, if large excesses of solvent have been used, for economic reasons any amount of solvent in excess of the amount desired can be volatilized to leave as product, a prepolymer in solution, e.g., of 20% to 80% by weight concentration.

The prepolymer compositions so obtained are particularly valuable as polysaccharide modifying agents such as water-proofing agents or sizing agents for starch and cellulose-based products. The prepolymer compositions are especially suitable in paper sizing applications and have particular advantages when used for such purposes in comparison with other sizing agents. These prepolymer compositions not only show greatly improved activity at standard concentrations, but in addition, these prepolymer compositions give sizing action which is simply related to the amount or percentage of applied prepolymer, based on the dry weight of the treated paper. Also these prepolymer compositions are excellent sizing agents in that they are relatively insensitive to pH; they are active over a wide pH range. They have shown sizing action when applied to aqueous paper pulp suspensions at pH's ranging from 5 to 13. Also, these prepolymer materials are relatively insensitive to the alum used in paper making processes. These prepolymers have given good sizing action to papers containing up to 3% alum. An important advantage in paper-sizing applications is that papers treated with these prepolymer materials retain 97–99% of the brigtness of the untreated paper, whereas many other sizing agents have severe limitations in use because of the loss in brightness of the sized paper as compared with untreated paper. It is within the scope of this invention to add the adduct (a) and the amine reactant (b), in the above defined proportions, separately to the paper pulp, and then admix them in such medium. It is preferred, however, to prepare the prepolymer in solution as indicated above, and then use the prepolymer solution for paper sizing applications or for water-profing application on starch or cellulose-based products. These prepolymers are useful for sizing and water-proofing raw natural cellulosic material such as cotton and various textile materails including cellulose containing filaments, fibers, yarns, and fabrics. The sizing action of these materials is permanent and is not removed from the cellulose by washing. This is believed to be due to the fact that in the presence of the polysaccharide substrate such as starch or cellulose, these prepolymer materials containing the active functional haloalkanol groups and amino hydrogens react to form insoluble, cross-linked polymers in the matrix of the polysaccharide substrate.

Other substrates which may be treated with the prepolymer compositions of this invention are, natural and synthetic fibers and fabrics such as wool, polyamide, polyimide, polyester materials as well as inorganic fibers and fabrics such as glass, etc.

Cellulosic paper products of various types may be treated with the ingredients of the compositions of this invention according to techniques known to those skilled in the art. For example, the prepolymer compositions or the adduct and amine ingredients thereof may be applied to finished paper stock directly, in solution, as an emulsion, or otherwise dispersed form. However, for best results it is preferred to add to the aqueous cellulosic paper pulp stock which is to be used in making said paper, the prepolymer reaction product of the adduct (a) and the amine (b) in solution in amounts sufficient to give the desired amount of sizing characteristics e.g., from 0.2 to 2% (although, concentrations by weight ranging from 0.01 to 5% based on the weight of the dry pulp can be used) before the pulp is formed into paper sheets, boards, etc.

A variety of pulps may be treated with the prepolymer compositions, or the ingredients, described above, and used to make the permanently sized paper according to this invention including bleached and unbleached sulfite pulp, bleached and unbleached kraft pulp, soda pulp, hardwood pulp, and mixtures of groundwood pulp with unbleached kraft pulp and other pulp.

The water-proofing of textile materials is accomplished according to this invention by impregnating the cellulosic textile material comprising cellulose filaments, fibers, fabrics, etc. with a solution of the prepolymers usually in water at pH 6–11 and then drying and thereafter subjecting the treated material to mildly elevated temperatures to produce a substantially water insoluble finish on the cellulosic textile. The textile material may be impregnated with the prepolymer compositions in solution of from 0.1% to 5% by weight of the prepolymer. The total amount of the prepolymer impregnated into the textile material is usually at least 0.3% by weight.

The compositions may be applied to the textile materials in various ways so long as impregnation of the textile materials is obtained. For example, the textile materials may be dipped or immersed in the composition or the composition may be dripped or sprayed on the textile materials until the textile material is wetted out with the composition. In order to facilitate the control of the application of the prepolymer of this invention on the textile materials and reduce the drying time, it is desirable to extract the textile material to remove excess solution therefrom. This is suitably accomplished by padding, ringing, squeezing, or hydro-extracting the textile material. The amount of the prepolymer applied to the textile material is controlled by the degree of extraction used and/or the concentration of these materials in the solution, and may be varied widely, depending upon the amount of water-repellency desired in the textile material. In general, the amount of such ingredients applied is between 0.1 and 5% by weight, based on the dry textile material, but good practical water-repellent effects are obtained on most textiles by applying from about 0.2 to 2% by weight, based on the dry textile material.

After the compounds have been applied, in solution, the textile material may then be dried at normal drying temperatures and finally heated to elevated temperatures of about 150 to 300° F. to obtain a water-repellent finish on the textile material. The temperature may be higher than 300° F. depending upon the particular textile material, the type and amount of catalyst and the duration of heating is limited only by the stability of the textile material. The duration of heating may vary widely depending primarily upon the liquid content and the temperature used that is generally between about 1 and 15 minutes with the longer time corresponding to the lower temperatures. The textile material thus obtained may be given the usual finishing operations such as a refinish wash to remove water-soluble materials, steam framing, and the like. Such operations may be desirable but are not essential. After the textile material has been dried of excess solution the compounds may be allowed to cure at room temperature with no added heating step required.

A large variety of textile materials comprising cellulose fibers may be treated in accordance with the processes of this invention. The textile materials treated may be woven or knitted fabrics, referred to generally as fabrics or yarns, filaments, or fibers but it is preferred to treat fabrics. The cellulose fibers may be natural cellulose fibers such as cotton, linen, flax, or ramie fibers, or regenerated cellulose staple fibers or filaments produced by the viscose or cuprammonium processes. It is preferred, however, to treat cotton fibers or viscose rayon staple fibers or filaments. The preferred textile materials are 100% cotton woven fabrics or 100% viscose rayon woven fabrics or woven fabrics composed entirely of cotton and viscose rayon. However, non-cellulosic fibers such as wool, glass, synthetic fibers, and the like may also be treated.

The compounds described above are incorporated into textile substrates in various manners, usually in the form of organic solutions or aqueous solutions or suspensions which are prepared according to techniques known in the art. These solutions may contain one or more of various types of cationic, anionic, or non-ionic wetting agents which are known in the art. The solutions of the above compounds may also contain other paper making or textile ancillaries such as stiffening or bodying agents, softening agents, curing agents, and high foaming agents, and the like but such agents are not essential.

As examples of stiffening or bodying agents which may be employed may be mentioned aqueous dispersions of water-insoluble thermoplastic vinyl resins such as polyvinyl acetate, polyvinyl chloride, polystyrene, polyalkylene acrylates, polyalkyl methacrylates, vinyl chloride, vinyl acetate copolymers and the like and/or water soluble thermoplastic resins such as polyvinyl alcohols; water-soluble partially hydrolyzed polyvinyl acetates, water soluble salts of styrene-maleic anhydride copolymers, styrene-alkyl acid maleate copolymers, vinyl acetate-maleic anhydride copolymers, vinyl acetate-crotonic acid copolymers, vinyl acetate-alkyl acid maleate copolymers; or the like. Generally such agents are employed in amount of about 0.05 to 5% by weight of the composition.

As examples of wetting agents which may be used may be mentioned sodium salts of alkylated benzene sulfonates such as sodium decyl benzene sulfonate, sodium dodecylbenzene sulfonate, sodium lauryl sulfate, the sodium salt of methyl stearamide ethionic acid, dioctyl sodium sulfosuccinate, and the like. In general, such agents are employed in amount of about 0.05 to 3%.

As examples of anti-foaming agents which may be used if desired may be mentioned water-insoluble silicone compounds, water insoluble oils, water-insoluble alcohols and the like. The amount of such agent used varies with its effectiveness in minimizing foaming, but in general, amounts of about 0.1 to 5% by weight of the composition may be employed.

Preparation of the "fresh adduct" for use in some of the following examples was conducted as follows:

To 49.0 g. (0.15 mole) of N-n-octadecyl-1,3-propanediamine dissolved in 200 ml. of methanol by warming, and cooled to 15° C., there was added 52.1 g. (0.563 mole; 25% excess) of epichlorohydrin. The mixture was stirred at 19°–21° C. and periodically sampled and analyzed during 22 hours. The reaction mixture was aspirated below 25° C., finally under pump vacuum of less than 1 mm. to remove unreacted epichlorohydrin and methanol leaving 85.8 g. of a viscous, but flowing, oily adduct, principally N - n - octadecyl - N,N',N' - tris(3 - chloro-2 - hydroxypropyl) - 1,3 - propanediamine which had a neutralization equivalent of 335, as compared with a calculated neutralization equivalent of 311.

EXAMPLE 1

This example illustrates the prepartion of a composition of the invention derived from the "fresh adduct" and the added amine in the molar proportion of 1.5:1 of adduct to amine.

To a 30.0 g. of a methanolic solution containing 10.6 g. (0.0170 mole) of the N - n - octadecyl - N,N',N'-tris(3 - chloro - 2 - hydroxypropyl) - 1,3 - propanediamine adduct there was added 3.9 g. (0.013 mole) of N - n - octadecyl - 1,3 - propanediamine. The mixture was stirred and heated slowly to reflux for 2.5 hours. After standing overnight, methanol was added to restore the weight of the reaction mixture to 33.9 g. This resulting product was a 42.7% by weight solution in methanol of the viscous prepolymer. This product solution was readily dissolved in water to give an homogeneous slightly turbid solution.

EXAMPLE 2

To 30 g. of a methanol solution containing 10.6 g. of an adduct of epichlorohydrin and N - n - octadecyl - 1,3-propanediamine (3:1 mole ratio) having a neutralization equivalent of 335, there was added 3.35 g. of N-n-octadecyl-1,3-propanediamine (adduct to amine mole ratio 1.75:1). The mixture was refluxed for 2.5 hours, restored to initial weight by adding methanol. The composition was a 41.9% solution of the prepolymer in methanol. This material was tested as a sizing agent as described in Example 25.

EXAMPLE 3

This example illustrates the preparation of two compositions of this invention using an halopropaneolamine adduct which has been stored and allowed to "age" for a sufficient time to allow the neutralization equivalent of the freshly prepared adduct to change from 341 to 461.

To a 23.8 g. (0.039 mole originally) portion of a stored adduct of epichlorohydrin and N - n - octadecyl-1,3-propanediamine condensed in a 3:1 mole ratio as in the first example, and having a neutralization equivalent of 461, dissolved in 30 g. of methanol, there was added 6.8 g. (0.0198 mole) of N - n - octadecyl - 1,3 - propanediamine as a solid giving a molar ratio of 2:1 of adduct to added amine, which dissolved by shaking the mixture at room temperature. Samples of this initial reaction showed a titer by Durbetaki titration of 1.295 milliequivalents (me.) per milliliter of reaction solution. Upon shaking for 60 hours, samples showed 1.165 me./ml. titer, or 90% of the original value. A 20.8 g. portion was bottled as sample A.

After heating the remaining reaction mixture for 2 hours at 60°–65° C. the titer was 1.015 me./ml., a loss of 21.6%, leaving a reaction product having a titer which was about 79% of that of the starting materials. (Sample B.)

EXAMPLE 4

Freshly prepared adduct of epichlorohydrin and a purified N - n - octadecyl - 1,3 - propanediamine (3:1 mole ratio) prepared as described above, was dissolved in methanol.

A 30.0 g. portion of the resulting methanol solution containing 10.6 g. of adduct (0.017 mole) was treated with 3.03 g. of N - n - octadecyl - 1,3 - propandiamine (0.00878 mole) and the resulting mixture was stirred at 25° C. to effect solution and then heated at reflux for 2.5 hours. There was obtained 37.2 g. of prepolymer solution. It was water-soluble and the solution foamed.

A 21.0 g. portion of the prepolymer solution derived from 5.98 g. of the adduct, corresponding to .0288 equivalent of added epichlorohydrin, was treated with 4.0 ml. of 1.03 N sodium hydroxide (4.1 me.) which was sufficient to neutralize 14.3% hydrogen chloride present as amine hydrochloride or as chloropropanol groups; as the alkali was added a precipitate separated. The mixture was heated for 2 hours at reflux, and cooled. The reaction product separated into two layers, the lower layer solidifying. The solid (4.5 g.) was isolated by decantation, washed with methanol, and bottled. This solid had gelled; it was insoluble in acetic acid as well as in methanol, illustrating the deleterious effect of even small amounts of alkali on the prepolymer.

EXAMPLE 5

A 30.0 g. solution of 10.6 g. epichlorohydrin: N-n-octadecyl-1,3-propanediamine adduct (3:1 mole ratio; neutralization equivalent 335) in methanol was treated with 2.61 g. of N-n-octadecyl-1,3-propanediamine (adduct to amine mole ratio, 2.25:1). The mixture was heated slowly to reflux (64° C.) and stirred for 2.5 hours. The weight of the reaction mixture was restored to the original weight by adding methanol. The resulting product was a 40.4% by weight solution of prepolymer in methanol.

EXAMPLE 6

This example illustrates the preparation of an inferior sizing agent in one step by treating the amine with the same amount of epihalohydrin as was involved in the preparation of the prepolymer product obtained by the two-step method of first preparing the adduct by reacting epihalohydrin with an amine and secondly reacting this resulting adduct with additional amine.

A solution of 8.9 g. of N-n-octadecyl-1,3-propanediamine in 20 g. of methanol was treated at once with 4.7 g. of epichlorohydrin (mole ratio equivalent to 2:1 of adduct to amine) at 35° C. The mixture was stirred and heated slowly to reflux (64° C.) for 2.5 hours. The resulting product was a 40% solution of product, based on the weight of the ingredients, in methanol.

EXAMPLE 7

This example illustrates the undesired effect on sizing effectiveness of preparing a composition similar to those of this invention in acetic acid.

To 10.6 g. of an adduct of N-n-octadecyl-1,3-propanediamine and epichorohydrin having a neutralization equivalent of 335 (3:1 mole ratio) dissolved in 20 g. of acetic acid there was added 3.0 g. of N-n-octadecyl-1,3-propanediamine (adduct to amine ratio of 2:1). The mixture was shaken for 1 hour but the solids did not dissolve. The mixture was heated in a 50° C. oil bath until dissolved, and then heated for 16 hours at 65°–70° C. The product weighed 33.6 g., and was a 40.5% solution of product in acetic acid.

EXAMPLE 8

To 24.2 g. (0.10 mole) of N-alkyl-1,3-propanediamine wherein the alkyl group is mainly $C_{12}$ alkyl, (being derived from coconut oil), in 150 ml. of hexane, there was added 38.1 g. (0.412 mole) of epichlorohydrin. The mixture was stirred at room temperature for 117 hours, during which time samples were extracted to determine the extent of reaction. After this time the reaction mixture was aspirated to remove hexane and epichlorohydrin. The residue was deep-frozen for a week and then concentrated to constant weight at 25° C/0.2 mm., leaving 49.8 g. of N-alkyl-1,3-propanediamine-epichlorohydrin adduct.

A 25.9 g. portion of this adduct was dissolved by shaking in 27.5 g. of methanol and kept refrigerated. A 14.5 g. portion of the resulting solution containing 7.05 g. of adduct in methanol was treated with a solution of 3.45 g. (0.01 mole) of N-n-octadecyl-1,3-propanediamine in 20 g. of methanol. The resulting mixture was refluxed for 2 hours and restored to initial weight by adding methanol. The resulting reaction product was a 26% by weight solution of prepolymer product in methanol, having 66% of its original titer. This solution had a total chlorine content of 3.93 percent, and an ionic chlorine content of 1.87%, indicating 47.6% hydrogen chloride ionization during the reaction.

EXAMPLE 9

To a methanol solution weighing 14.5 g. containing 7.05 g. of the adduct described in Example 8 there was added 4.16 g. of N-stearoyldiethylenetriamine, and the mixture was refluxed for three hours, until the 40% solution of product in methanol retained 92.5% of its initial titer.

EXAMPLE 10

A 13.1 g. portion of an adduct of diethylenetriamine and 5 molar equivalents of epichlorohydrin (prepared by dissolving 10.3 g. of diethylenetriamine in 125 g. of methanol, cooling to 5°–10° C., treating the cooled solution with 57.8 g. of epicholorhydrin, stirring the reaction mixture for 26 hours and removing the solvent and excess epichlorohydrin) was dissolved in 50 g. of ethanol by shaking at room temperature. To a 19.1 g. portion of the ethanol-adduct solution there was added 1.88 g. of n-octadecylamine, the mixture was shaken until homogenous, and refluxed for 3.5 hours. The total chlorine content of the resulting product solution was 8.46% and the ionic chlorine content was 2.83% indicating a 33.4% transfer of hydrogen chloride within the product.

EXAMPLE 11

A 19.1 g. portion of the adduct diethylenetriamine+5 epichlorohydrin dissolved in 50 g. of ethanol (prepared as described in Example 10), there was added 2.42 g. ot N-n-octadecyl-1,3-propylenediamine, and the mixture was refluxed for 3.5 hours, and restored to initial weight by adding ethanol. The product was a 29.7% by weight solution in ethanol, and analysis indicated 41.6% hydrogen chloride transfer during the formation of prepolymer.

EXAMPLE 12

To 20 g. of a solution of 95.9 g. of an adduct of n-octadecylamine and epichlorohydrin (mole ratio, 1:2) in 100 g. of methanol there was added 3.78 g. of n-octadecylamine. The resulting mixture was refluxed for 2 hours, cooled, restored to original weight with methanol to obtain a 57% solution-suspension in methanol of the corresponding prepolymer.

EXAMPLE 13

To 40 g. of an adduct solution obtained by dissolving 95.9 g. of an adduct of n-octadecylamine and epichlorohydrin (mole ratio, 1:2) in 100 g. of methanol there was added 6.9 g. of N-n-octadecyl-1,3-propylenediamine. The mixture was shaken and then heated to reflux for 2 hours. The product was a 56.8% solution-suspension of prepolymer in methanol.

EXAMPLE 14

To 20 g. of a solution of adduct of the type described in Example 13 there was added 5.38 g. of aminoamide having a neutralization equivalent of 269 prepared by condensing diethylenetriamine with a commercial grade (95%) dimer acid of the linoleic acid type, said dimer acid having an acid value of 188–193, and a saponification value of 194–198 ("Empol 1014," Emery Industries, Inc.). The adduct aminoamide mixture in methanol was shaken and then heated for 2 hours at reflux. The resulting product solution contained 59.8% prepolymer by weight in methanol.

EXAMPLE 15

This example illustrates the preparation of prepolymers involving the use of a salt of the adduct with a dimer acid amido-amine.

To 10.0 g. of nitrilotris(3-chloro-2-hydroxypropanol) hydrochloride dissolved in 50 g. of methanol there was added 7.8 g. (0.03 equiv. amine basicity) of amido-amine (prepared by condensing dilinoleic acid with excess diethylenetriamine at 160–170°) and the mixture was stirred to homogeneous solution and then heated and stirred slowly to reflux for 2.5 hours. There was obtained 26.2% by weight solution of prepolymer in methanol.

EXAMPLE 16

This example illustrates the preparation of prepolymer products using adducts of epihalohydrin and an amine, which adduct had been neutralized to obtain the salt form by adding acid, precipitating and re-dissolving in solvent before adding the amine reactant (b).

To 5.0 g. (0.01 mole) of an adduct salt from 4 moles of epichlorohydrin with one mole of ethylenediamine finally neutralized with hydrogen chloride to form the dihydrochloride salt, N,N,N',N'-tetrakis(3-chloro-2-hydroxypropyl)ethanediamine dihydrochloride, in 20 g. of methanol there was added 3.4 g. (0.01 mole) of a purified N-n-octadecyl-1,3-propanediamine, and the mixture was stirred and heated to 65° C. for 2.5 hours to obtain a 29.6% solution of prepolymer in methanol, which was substantially soluble in water.

EXAMPLE 17

A prepolymer was prepared by adding 2.34 g. (0.00665 mole) of "Duomeen T" (an N-alkyl-1,3-propanediamine commercial mixture wherein the alkyl is a mixture of n-alkyl and n-alkenyl groups, predominantly $C_{16}$ and $C_{18}$) to 25 g. of a methanolic solution containing 8.4 g. of an "aged" adduct of "Duomeen T" with 3 moles of epichlorohydrin, which had a neutralization equivalent of 469. The mixture was stirred at 64° C. for 2.5 hours. Original weight of the mixture was restored by replacing volatilized methanol to obtain a 39.2% solution of prepolymer in methanol.

EXAMPLE 18

To 25 g. of a methanol solution containing 10.6 g. of an aged adduct of "Duomeen T" and epichlorohydrin, having an average chloropropanol content of 2.6 groups per mole of amine, and a neutralization equivalent of 427, there was added 4.22 g. (0.0120 mole) of "Duomeen T." After heating for 2.5 hours the titer of the prepolymer solution thus obtained changed from 1.543 me./ml. to 1.121 me./ml.

EXAMPLE 19

A prepolymer product was prepared by adding 4.22 g. (0.012 mole) of "Duomeen T" to 25 g. of a methanol solution containing 10.6 g. of an adduct "Duomeen T" and epichlorohydrin, having an average of 2.6 groups of added epichlorohydrin per molecule of "Duomeen T" and a neutralization equivalent of 286, stirring the mixture to solution, and then heating to 65° C. for 2.5 hours. Methanol was added to restore original weight and to obtain a 50.7% solution of prepolymer in methanol.

EXAMPLE 20

To 25 g. of a methanolic solution containing 6.4 g. of an adduct of "Adogen 501" (Archer-Daniels-Midland Co.), said to be N-alkyl-1,3-propanediamines containing 2% $C_{14}$, 13% $C_{16}$, 30% of $C_{18}$, 30% $C_{20}$, 25% $C_{22}$ n-alkyl groups, and 3 epichlorohydrin, having a neutralization equivalent 364 there was added 2.6 g. of "Adogen 501." The mixture was stirred and heated at 65° C. for 2.5 hours, during which time the titer changed from 1.031 me./ml. to 0.752 me./ml.

EXAMPLE 21

To 50 g. of a methanol solution containing 16.6 g. of a fresh adduct of "Duomeen T" and epihalohydrin which contained an average of 2.8 chloropropanol groups per amine molecule and having a neutralization equivalent of 334, there was added 4.68 g. of "Duomeen T." The resulting mixture was stirred and heated slowly to reflux (64° C.) and kept at that temperature for 2.5 hours. The mixture was cooled and treated with methanol to restore original weight. The resulting prepolymer was dispersible and/or soluble in water as a viscous turbid solution.

EXAMPLE 22

This example illustrates the effect of adduct amine ratio using aged adduct.

A 50 g. methanol solution of a fresh adduct of "Duomeen T" and epichlorohydrin prepared as in Example 21 having N.E. 342 (initial N.E. 334) was heated for two hours to 67° C. during which time the N.E. rose to 548. The resulting aged adduct was divided into 2 portions and treated as follows:

A. To a 25 g. portion of the "aged" adduct solution there was added 2.34 g. of "Duomeen T" (an adduct to amine ratio of 2:1), and the mixture was heated to reflux 67° C. for 3.5 hours. Methanol was added to restore weight and give a 39% solution of prepolymer in methanol.

B. A 24.2 g. portion was treated with 3.1 g. of "Duomeen T" (an adduct to amine ratio of 1.5:1) and the mixture was heated and stirred as described above. Methanol was added to restore weight to give a 41% solution of the resulting prepolymer in methanol.

Both samples A and B were tested as paper sizing agents for "off machine" sizing. The results appear in Example 25.

EXAMPLE 23

This example illustrates the preparation of prepolymer compositions having predominantly alkenyl hydrophobic groups therein.

Adduct preparation:

A. Fresh. To 68.4 g. of "Oleic 1,3-propylenediamine" (Armour Industrial Chemical Co. "Duomeen O") in 200 g. of methanol, there was added at once 53.9 g. (0.583 mole) of epichlorohydrin and the mixture was maintained at 20–25° with a water bath. The mixture was allowed to stand for three days during which time samples were taken to determine the extent of reaction. When the reaction had proceeded to 111% of theory for an adduct of 2.9 epichlorohydrin and one "Duomeen O," the adduct had a neutralization equivalent of 338. The product comprised a 34.8% solution of the adduct in methanol.

B. Aged. A 100 g. portion of the above prepared adduct solution was heated to 65° C. for 2.5 hours. The neutralization equivalent was then 486.

Prepolymer preparation:

A. To 36.8 g. of the "Duomeen O"-2.9 epichlorohydrin fresh adduct in methanol solution (34.8% of adduct in methanol) there was added 4.78 g. of "Duomeen O," to give an adduct:amine ratio of 1.5:1. The mixture was heated and stirred to 65° C., after which time the prepolymer solution analyzed as containing 72.5% of initial titer.

B. To 36.8 g. of a methanol solution containing 12.8 g. of the heat aged adduct, described above, there was added 3.59 g. of "Duomeen O" to give an adduct:amine ratio of 2:1. The mixture was heated to 66° C. with stirring. The prepolymer product analyzed as containing 78.2% of initial titer.

EXAMPLE 24

To illustrate the fact that no prepolymer product and therefore no useful sizing or carbohydrate modification is obtained unless there is used an adduct having at least 2 haloalkanol equivalents per molecule of amine, and also the ratio of reactants is chosen to insure subsequent formation of a cross-linked polymer even though a trifunctional amine is employed, the following run was made following the procedure of U.S. 3,031,505.

A solution of 27.0 g. (0.1 mole) of n-octadecylamine in 100 g. of 2-propanol was effected by heating the mixture to 60–65° C. with stirring; at 63° C. a solution of 9.3 g. (0.1 mole) of epichlorohydrin in 50.0 g. of 2-propanol was added dropwise in 30 minutes. Then at 63° C. stirring was continued for 2 hours. Analysis by the Durbetaki method indicated that the product contained only 67.4 me. of basic nitrogen remaining (theoretical is 100, assuming disappearance of all of the oxirane content of the epichlorohydrin). Thus this "intermediate" contained at most only 67.4% of its original basic nitrogen the remainder being neutralized by extensive hydrogen chloride transfer between amine and oxirane groups. Disproportionation at this stage to form other by-products (dichlorohydrin, etc.) is also indicated by the following data.

This reaction mixture was added to 35.2 g. (0.1 mole) of "Duomeen T" dissolved in 100 g. of 2-propanol, which was stirred under reflux (82° C.), over a period of 45 minutes. The mixture was heated and stirred for an additional 1.5 hours to complete the reaction and cooled overnight, during which time a flocculent precipitate formed. The precipitate was redissolved by heating to 75° C., the solution analyzed, and found to have 73.5% residual titer based on the total initial amines. A 155 g.

portion of this reaction mixture was bottled hot to obtain a homogeneous sample and submitted for paper sizing evaluation as a 19.1% solution-suspension in 2-propanol, termed sample A.

The remaining 166.7 g. portion of the reaction mixture, calculated as containing .052 mole of each of the components, was treated with 5.2 g. of 40% aqueous sodium hydroxide, and the mixture was heated and stirred for 2 hours at reflux, 80° C. The temperature was then raised to distill isopropanol-water azeotrope and finally to complete the reaction at 220° C. briefly. The cooled mixture was treated with hexane, ether, and water. The organic layer was separated, dried over magnesium and calcium sulfates, filtered, distilled to remove solvents and finally aspirated to about 100° C., leaving 37.1 g. of amber oil. This oil was not homogeneous and on cooling a portion of it became waxy and an upper layer remained fluid. A sample made homogeneous by adding hexane was evaluated as a sizing agent. It has N.E.=296. Sample B.

A sample, 8.2 g. of solvent-free product was distilled at reduced pressure (less than 1 mm.) in a short-path 25-ml. still. A fraction, 2.5 g., was collected at 140–170° C., up to a metal-bath temperature of 250°, when distillation was discontinued due to decomposition of the residue. The distillate solidified partially at 25°; it was warmed to homogeneity, and analyzed: N.E.=258. The properties can only be explained by the assumption that the solvent-free product contained at least 30% by weight of unchanged starting materials, principally n-octadecylamine (N.E.=269.5), and some lower boiling homologs of "Duomeen T" (N.E.=173). Undoubtedly additional "Duomeen T" homologs were also present but could not be isolated due to decomposition.

The residual "polymer" was easily soluble in organic solvents (acetone, acetic acid, and xylene) and therefore was not a cross-linked gel.

EXAMPLE 25

This example illustrates the utility of the prepolymer compositions of this invention as cellulose modifying agents and the superiority of products made via the adducts employing ratios which will lead to cross-linked polymers at the higher degrees of reaction.

The preferred way of applying the prepolymer compositions to paper products is to add the composition in the desired amount to the aqueous pulp suspension which is to be used in making said paper. To that end, then, some of the prepolymer compositions described above, were tested according to the following standard test which is called the "wet end method."

There was dissolved or dispersed 0.75 g. of the test compound or composition (100% solids basis if a solution) in water, and this mixture was added to refined bleached Gatineau sulfite pulp (2% aqueous suspension, dry pulp basis). The thus treated pulp was brought to pH 9 with alkali (NaOH) and handsheets of paper were made with the treated pulp on the Noble-Wood Machine; handsheets of untreated paper were also prepared. The dried paper directly from the machine drier is termed "off machine" paper. Cured samples of treated and untreated (control) paper were prepared by heating "off machine" paper in an oven for 60 minutes at 105° C.

The treated papers and control samples of untreated "off machine" and "cured" papers were tested according to the standard ink penetration test in which the time, in seconds, required for ink to penetrate through the paper floating on top of the ink bath was noted.

Each composition tested was applied to the pulp at a concentration of 1% by weight, based on the weight of the dry pulp. The compositions are listed by the example number, with the indicated results following such number.

*Sizing-time in seconds*

| Example | Off Machine | Off Machine-Cured |
|---|---|---|
| 1 | 6,000 | 6,000 |
| 2 | 2,025 | >6,000 |
| 3 | 3,600 | >6,000 |
|   | 6,000 | >6,000 |
| 6 | 230 |  |
| 7[1] | 0 | [2]>0 |
| 8 | 1,960 | 2,375 |
| 17 | 3,300 |  |
| 18 | >6,000 |  |
| 19 | 3,600 |  |
| 21 | >6,000 |  |
| 22A | >6,000 |  |
| B | 4,700 |  |
| 24A | 0 | 0 |
| B | 0 |  |
| Untreated (Controls) | 0 | 0 |

[1] Acetic acid used as solvent.
[2] >0 means ink penetration was not instantaneous but less than 1 second.

Variation and modification of the invention as described are within the scope of the invention, the essence of which is that there have been provided (1) new prepolymer reaction products, (2) processes for preparing the same from (a) an adduct of an epihalohydrin and an amine, and (b) an amine in certain proportions (3) polysaccharide treated with the composition described above, and (4) methods of treating polysaccharides to improve the sizing and water-repellent characteristics thereof.

What is claimed is:

1. A sized cellulosic paper comprising cellulose-containing paper impregnated with a minor amount sufficient to give sizing of a prepolymer which is the reaction product of (a) an essentially monomeric adduct of at least two molar proportions of an epihalohydrin per molar proportion of an amine having at least 1 primary amino nitrogen and from 2 to 8 amino hydrogens, and (b) an amine having at least 2 amino hydrogens, said adduct (a) having at least 2 haloalkanol groups per mole of amine, at least one of said adduct (a) and said amine (b) having at least 3 reactive groups, the molar proportions of said adduct (a) to said amine (b) being such that the adduct (a) provides at least 3 haloalkanol equivalents and the adduct (a) and amine (b) provide at least 3 amino hydrogens for each combined total of from 6 to 14 haloalkanol and amino hydrogen equivalents, at least one of said adduct (a) and amine (b) reactants containing a group selected from the class consisting of alkyl and alkenyl radicals having at least 10 carbon atoms, said prepolymer being characterized by the fact that when said prepolymer is contacted with an aqueous medium having a pH greater than 5 said prepolymer is converted to an insoluble cross-linked polymer.

2. A sized cellulosic paper comprising cellulose-containing paper impregnated with a minor amount sufficient to give sizing of a prepolymer as described in claim 1 wherein thet essentially monomeric adduct (a) used to prepare said prepolymer is obtained by reacting epichlorohydrin with a mixture of N-alkyl-1,3-propanediamines wherein the alkyl radicals have at least 10 carbon atoms, and the amine (b) used to prepare said prepolymer is a mixture of N-alkyl-1,3-propanediamines wherein the alkyl radicals have at least 10 carbon atoms.

3. A sized cellulosic paper as described in claim 1 wherein the amine used to form the adduct (a) and the amine (b) each have a formula selected from the group consisting of (I) 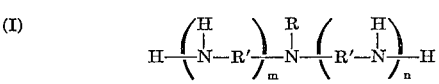

and (II) 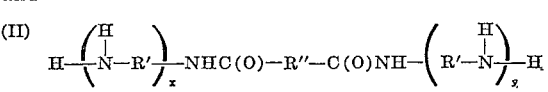

wherein R is selected from the group consisting of alkyl, alkenyl, and R'''C(O)— radicals having at least 10 carbon atoms, each R' is an alkylene radical having from 2 to 6 carbon atoms, each $m$ and $n$ is an integer of from 0 to 6, $m$ plus $n$ equals 0 to 6, each $x$ and $y$ are integers of at least 1, and $x$ plus $y$ equals 2 to 8, R" is selected from the group consisting of alkylene, alkenylene, and cycloalkenylene radicals having from 10 to 60 carbon atoms, and R''' is selected from the group consisting of alkyl, and alkenyl radicals having from 10 to 24 carbon atoms.

4. A sized cellulosic paper as described in claim 3 wherein the prepolymer used is a prepolymer in which the amine used to make the adduct (a) and the amine (b) each have Formula I, in which the R moieties are mixtures of alkyl and alkenyl radicals having at least 10 carbon atoms, R' is ethylene, $n$ is 1, and $m$ is 0.

5. A sized cellulosic paper as described in claim 4 wherein the prepolymer used is derived from (a) an adduct of epichlorohydrin and an N-alkyl-1,3-propanediamine wherein the alkyl is in a mixture of n-alkyl and n-alkenyl groups having at least 10 carbon atoms, and (b) an N-alkyl-1,3-propanediamine wherein the alkyl is in a mixture of n-alkyl and n-alkenyl groups having at least 10 carbon atoms.

6. A method of sizing cellulosic paper which comprises adding to the aqueous pulp which is to be used to make said paper a minor amount sufficient to give sizing of (a) an essentially monomeric adduct at least two molar proportions of an epihalohydrin per molar proportion of an amine having at least one primary amino nitrogen and from 2 to 8 amino hydrogens per amine molecule, and (b) an amine having at least 2 amino hydrogens, said adduct (a) having at least 2 haloalkanol groups per moleclue of adduct, at least one of said adduct (a) and amine (b) having at least 3 reactive groups, said adduct (a) and amine (b) being added to said pulp in such molar proportions, relative to each other, that the adduct (a) provides at least 3 haloalkanol equivalents, and the adduct (a) and amine (b) provide at least 3 amino hydrogens for each combined total of 6 to 14 haloalkanol and amino hydrogen equivalents, and at least one of the adduct (a) and the amine (b) contains a group selected from the group consisting of alkyl and alkenyl radicals having at least 10 carbon atoms, said aqueous pulp having a pH of at least 5, and then forming the thus treated aqueous pulp into paper.

7. A method of sizing cellulosic paper which comprises adding to an aqueous pulp which is to be used in making said paper a minor amount sufficient to give sizing of a prepolymer which is the reaction product of (a) an essentially monomeric adduct of at least two molar proportions of an epihalohydrin per molar proportion of an amine having at least 1 primary amino nitrogen and from 2 to 8 amino hydrogens, and (b) an amine having at least 2 amino hydrogens, said adduct (a) having at least 2 haloalkanol groups per mole of amine, at least one of said adduct (a) and said amine (b) having at least 3 reactive groups, the molar proportions of said adduct (a) to said amine (b) being such that the adduct (a) provides at least 3 haloalkanol equivalents and the adduct (a) and the amine (b) provide at least 3 amino hydrogens for each combined total of from 6 to 14 haloalkanol and amino hydrogen equivalents, at least one of said adduct (a) and amine (b) reactants containing a group selected from the class consisting of alkyl and alkenyl radicals having at least 10 carbon atoms, said prepolymer being characterized by the fact that when said prepolymer is contacted with an aqueous medium having a pH greater than 5 said prepolymer is converted to an insoluble cross-linked polymer, and then forming paper from the resulting pulp composition.

8. A method of sizing cellulosic paper which comprises adding to an aqueous pulp which is to be used in making said paper a minor amount sufficient to give sizing of a prepolymer as described in claim 7 wherein the essentially monomeric adduct (a) used to prepare said prepolymer is obtained by reacting epichlorohydrin with a mixture of N-alkyl-1,3-propanediamines wherein the alkyl radicals have at least 10 carbon atoms, and the amine (b) used to prepare said prepolymer is a mixture of N-alkyl-1,3-propanediamines wherein the alkyl radicals have at least 10 carbon atoms, and then forming paper from the thus treated aqueous pulp composition.

9. A method as described in claim 7 wherein the amine used to form the essentially monomeric adduct (a) and the amine (b) used to prepare the prepolymer composition each have a formula selected from the group consisting of (I) 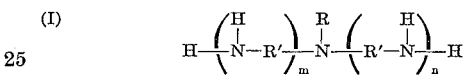

and (II) 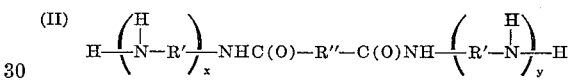

wherein R is selected from the group consisting of alkyl, alkenyl, and R'''C(O)— radicals having at least 10 carbon atoms, and each R' is an alkylene radical having from 2 to 6 carbon atoms, each $m$ and $n$ is an integer of from 0 to 6, $m$ plus $n$ equals 0 to 6, each of $x$ and $y$ equals 2 to 8, R" is selected from the group consisting of alkylene, alkenylene, cycloalkenylene radicals having from 10 to 60 carbon atoms, and R''' is selected from the group consisting of alkyl, and alkenyl radicals having from 10 to 24 carbon atoms.

10. A method as described in claim 9 wherein the prepolymer used is a prepolymer in which the amine used to make the adduct (a) and the amine (b) each have Formula I in which the R moieties are mixtures of alkyl and alkenyl radicals having at least 10 carbon atoms, R' is ethylene, $n$ is 1, and $m$ is 0.

11. A method as described in claim 10 wherein the prepolymer used is derived from (a) an adduct of epichlorohydrin and an N-alkyl-1,3-propanediamine wherein the alkyl is in a mixture of n-alkyl and n-alkenyl groups having at least 10 carbon atoms, and (b) an N-alkyl-1,3-propanediamine wherein the alkyl is in a mixture of n-alkyl and n-alkyenyl groups having at least 10 carbon atoms.

References Cited by the Examiner
UNITED STATES PATENTS

| | | | |
|---|---|---|---|
| 2,938,004 | 5/1960 | De Hoff et al. | 260—2 |
| 3,051,664 | 8/1962 | Turner | 260—2 |
| 3,058,873 | 10/1962 | Keim et al. | 162—164 |
| 3,129,133 | 4/1964 | Doyle et al. | 162—164 |

DONALL H. SYLVESTER, *Primary Examiner.*

WILLIAM H. SHORT, *Examiner*

STEWART N. RICE, S. LEON BASHORE,
*Assistant Examiners.*